United States Patent [19]

Wilson

[11] Patent Number: 4,838,545
[45] Date of Patent: Jun. 13, 1989

[54] EXERCISE DEVICE FOR USE ON A POOL DECK WEIGHTED LEVER

[76] Inventor: Charles Wilson, 6060 12th St., N., St. Petersburg, Fla. 33703

[21] Appl. No.: 174,242

[22] Filed: Mar. 28, 1988

[51] Int. Cl.$^4$ ............................................. A63B 21/00
[52] U.S. Cl. ...................................... 272/117; 272/71; 403/234
[58] Field of Search ................. 272/71, 116, 117, 134, 272/900; 403/191, 234, 237

[56] References Cited

U.S. PATENT DOCUMENTS

| | | | |
|---|---|---|---|
| 3,522,960 | 8/1970 | Moore | 403/234 |
| 3,856,297 | 12/1974 | Schnell | 272/117 X |
| 4,076,126 | 2/1978 | Gilmour | 403/234 X |
| 4,226,414 | 10/1980 | Coffaro et al. | 272/117 |
| 4,247,096 | 1/1981 | Schmitt | 272/71 |
| 4,344,618 | 8/1982 | Dudley | 272/117 |
| 4,407,495 | 10/1983 | Wilson | 272/117 |

FOREIGN PATENT DOCUMENTS

| | | | |
|---|---|---|---|
| 12554 | of 1896 | United Kingdom | 403/191 |
| 235 | of 1903 | United Kingdom | 272/117 |
| 241646 | 4/1984 | United Kingdom | 272/117 |

Primary Examiner—Richard J. Apley
Assistant Examiner—Robert W. Bahr

[57] ABSTRACT

An exercise device which may be attached to the side of a pool of water which enables an individual to do chin up type exercises while suspended in water by pulling down on a grasping bar which is attached to a lever arm by cables which are adjustable. The amount of pressure needed to pull down the grasping bar is regulated by varying the amount of weight placed on a bar attached to the resistance end of the lever arm. As the grasping bar is pulled upon, the lever arm rotates on an axle bar which is supported by two uprights. Running through the uprights below the axle bar is a safety bar which prevents the lever arm from making a full rotation on the axle bar and striking the user. The uprights which support the axle bar and safety bar are connected to horizontal bases which extend away from the pool. The vertical uprights and horizontal bases are connected together by corner plates and braces. The device is held in place by fasteners placed through the bases into the pool deck. Extending below the uprights into the water is a roller bar system which is composed of two rolling pipes which are positioned in front of the exerciser to keep his body in a comfortable alignment as he rises and falls in the water while pulling on the grasping bar. The roller bars are positioned through a system of guide pipes and modified pipe tees which serve as adjustable connectors.

1 Claim, 5 Drawing Sheets

EXERCISE DEVICE FOR USE ON A POOL DECK WEIGHTED LEVER

BACKGROUND ART

Pulley type exercise equipment and chin up bars have been known from antiquity but the exercise device described herein is unique and different in a number of ways.

1. It is designed primarily for use over water.
2. It has a roller bar system which extends down into the water to keep the users body in preferred alignment as the device is used.
3. It utilizes the lever principal to reduce friction and reduce the amounts of weight required to achieve the exercise pressure desired.
4. Since it is connected to the pool deck above the water level it is easily installed, and can be moved or removed without the need of going into the pool to do the installation work.
5. It enables an individual of moderate strength to do chin up type exercises while suspended in water. Thus strengthening his muscles in a way not ordinarily obtainable.

SUMMARY OF THE INVENTION

In the operation of the invention described herein this application the exercise device is first assembled and bolted down, by sleeve anchors or other means, to the deck adjoining a pool of water. Ideally the depth of the pool of water should be such that the exerciser may be suspended in the water up to his neck without his feet touching the pool bottom.

The exerciser enters the pool of water and reaches up and grips the grasping bar of the invention in a chin up like position. Cables which connect the grasping bar to the end of a lever arm are then adjusted to a length which positions the exerciser's body in water up to his neck and his feet suspended above the bottom of the pool. Enough weights are then placed on the weight bar located on the resistance end of the lever arm to hold the exerciser's body suspended in the water.

The exerciser then pulls down on the grasping bar with a chin up like movement. The force on the grasping bar, caused by the exerciser pulling down, causes the lever arm to rotate and the grasping bar to come down and the exercisers body to rise in the water simultaneously. As the exerciser rises, the buoyancy of the water and the exercise movement cause his legs and lower body to bend forward and up. To offset the unwanted contortion caused by this bending action a pair of roller bars, which are a part of the invention, extend below the water in front of the exerciser. As the exerciser rises the roller bars keep his body in desired alignment as he comfortably slides over them. The roller bars position may be adjusted horizontally and vertically to accomodate the exerciser.

If it were not for the roller bars preventing the exercisers body from contorting, the purpose of the invention—which is to aid those with weak backs correct their condition through manageable effective exercise—would be defeated.

As the exerciser builds up his strength over a period of time more weights may be added to the lever arm and the cables which connect the grasping bar to the lever arm may be shortened to increase the amount of pressure required to pull the grasping bar down making the exercises more strenuous.

The primary achievement of the invention is that it allows an individual to do chin up type exercises while in suspension with an adjustable amount of physical exertion required.

DETAILED DESCRIPTION

Figure 1:
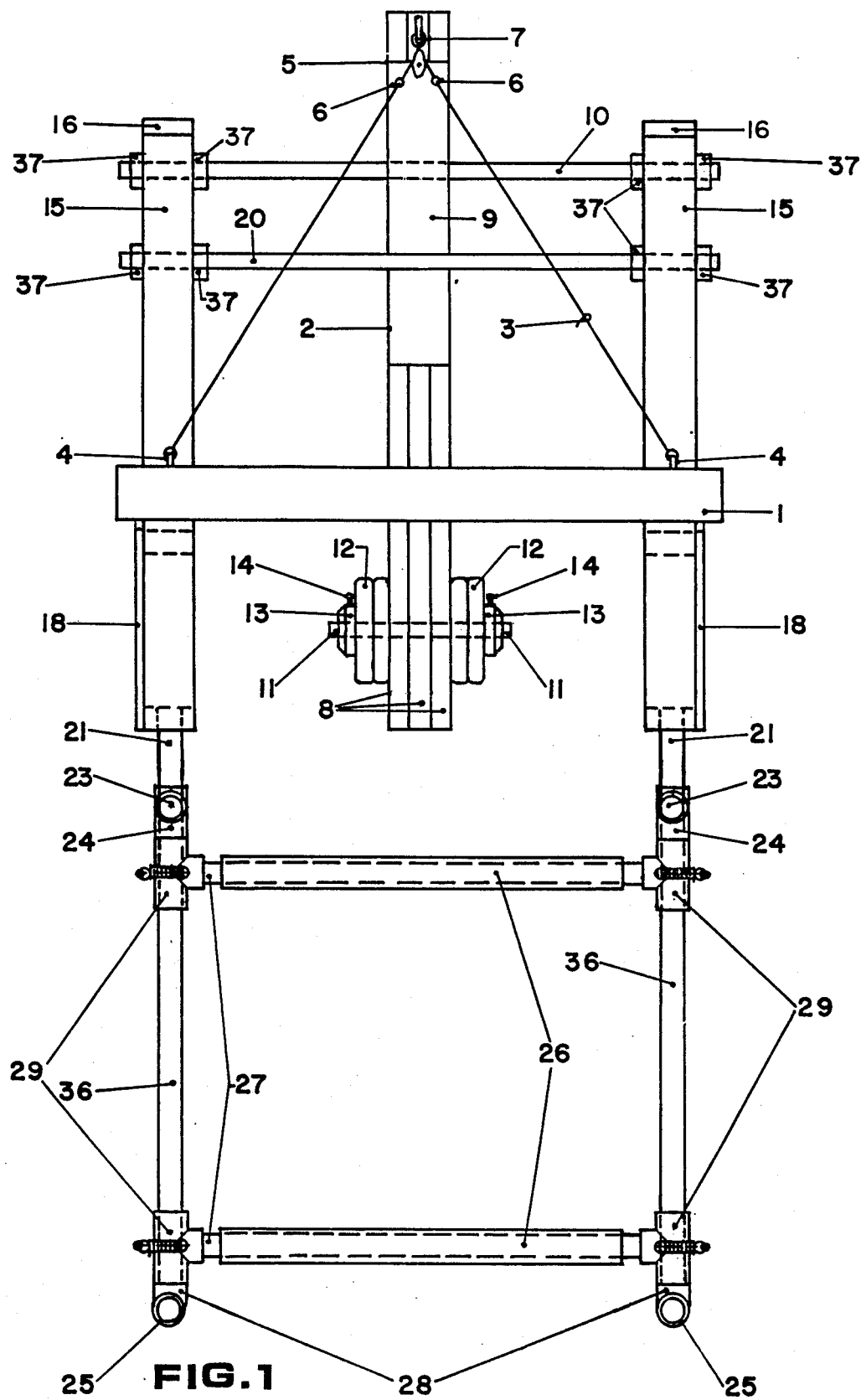
FIG. 1 is a view of the exercise device as seen facing the device from the front.
Figure 2:
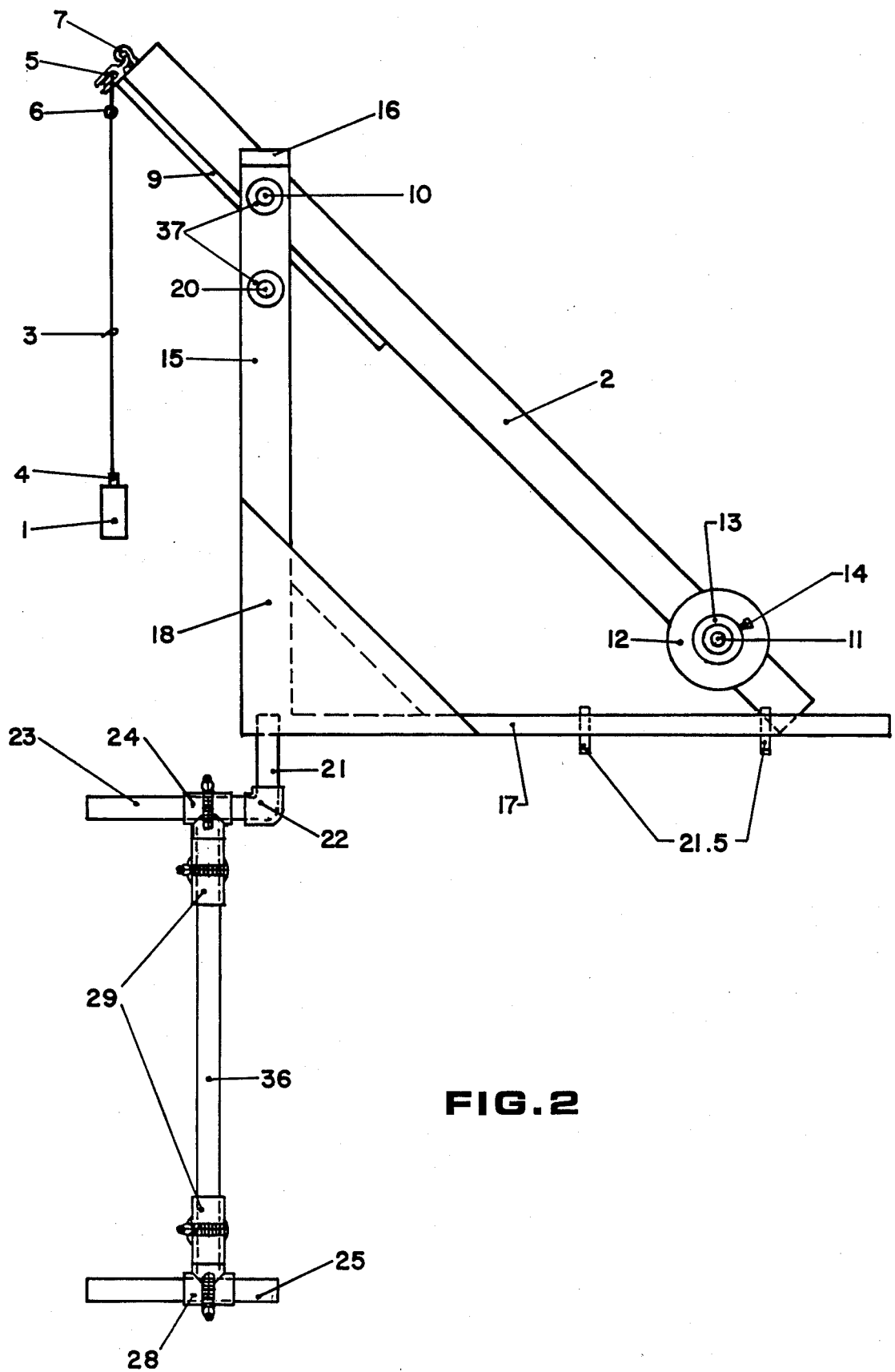
FIG. 2 is a side view of the device.
Figure 3:
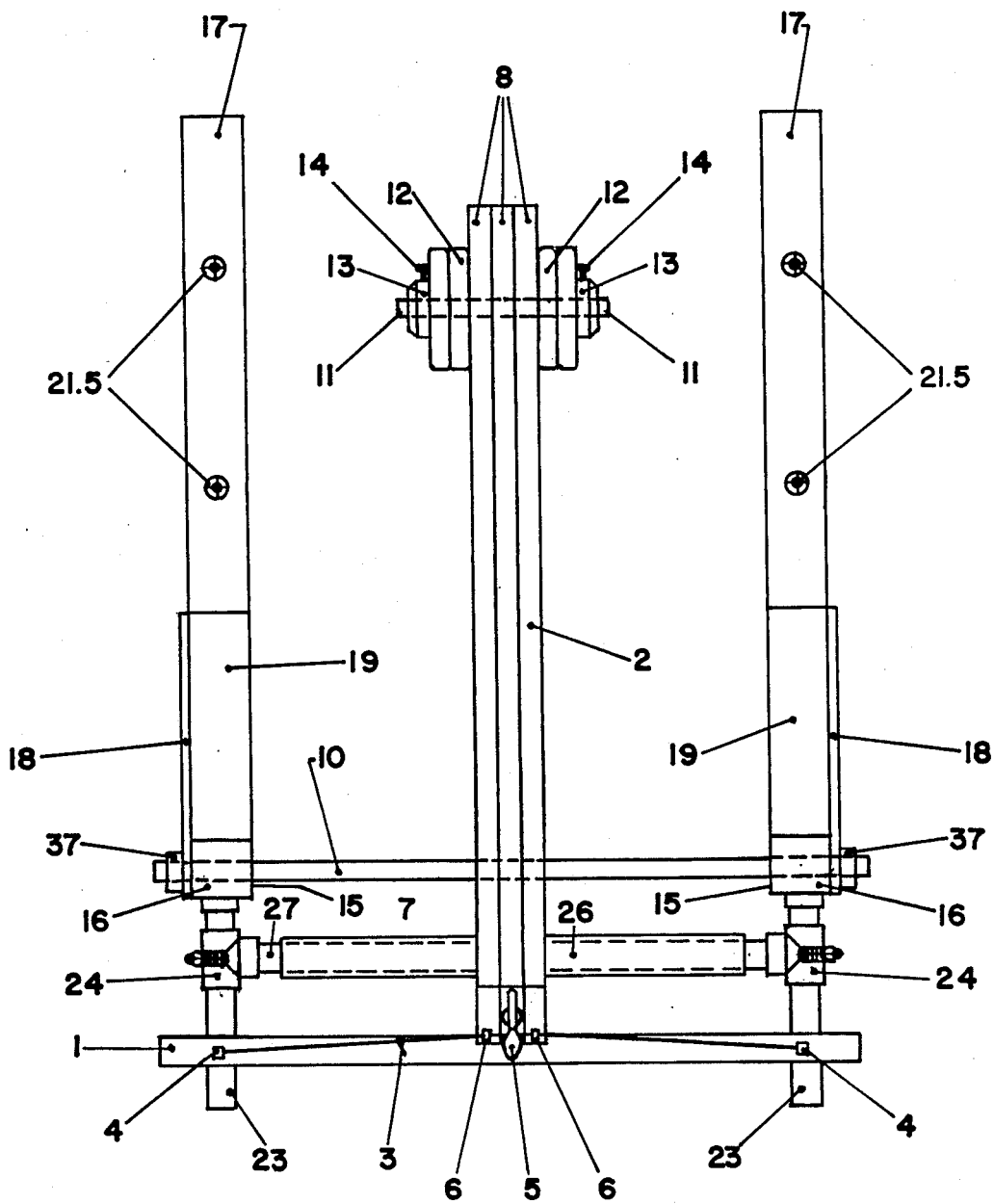
FIG. 3 is a top view of the device.

Refering to FIGS. 1,2 and 3.

A grasping bar 1 made of 2"×4" wood is attached to a lever arm 2 by wire cables 3 ties to eye hooks 4 and looped thru pulley 5 which is hooked to a large eye hook 7 screwed into the end of the lever arm 2. Two stops 6 keep the grasping bar 1 from tilting excessively when pulled upon. The lever arm 2 is made of 2"×4" boards 8 nailed together and reinforced at the fulcrum point by a ¾" board 9.

Weights 12 are inserted on a weight holding bar 11 which passes through the lever arm 2. The amount of weights 12 can be varied by loosening the set screws 14 and removing the weight collars 13 thus varying the amount of pressure required to pull down the grasping bar 1.

The lever arm 2 is supported by, and turns on an axle bar 10 which acts as a fulcrum. The axle bar 10 passes thru 4"×4" wooden uprights 15 which support it. Below the axle bar 10 is the safety bar 20 which prevents the lever arm 2 from being pulled over into a complete rotation on the axle bar 10 and striking the user.

The axle bar 10 and the safety bar 20 are held to the uprights 15 by screw down collars 37.

The tops of the uprights 15 are capped with metal 16 for reinforcement.

The uprights 15 connect to the bases 17 (FIGS. 2-3), the connection is secured by ¼" plywood corner plates 18 and 2"×4" corner braces 19 (FIG. 3).

The bases 17, uprights 15, corner plates 18 and corner braces 19 (FIG. 3) are nailed together to form a strong stable joint.

The bases 17 may be connected to a pool deck by means of fasteners 21.5 (FIGS. 2-3) such as sleeve anchors.

Recessed into the bottoms of the two uprights 15 are 1½" diameter schedule 40 PVC 21 to which are connected elbows 22.

From the elbows 22 extend the top horizontal guide pipes 23 which are 1½" diameter schedule 40 PVC pipes.

Sliding on the top horizontal guide pipes 23 are modified pipe tees 24 made of PVC.

Figure 4:
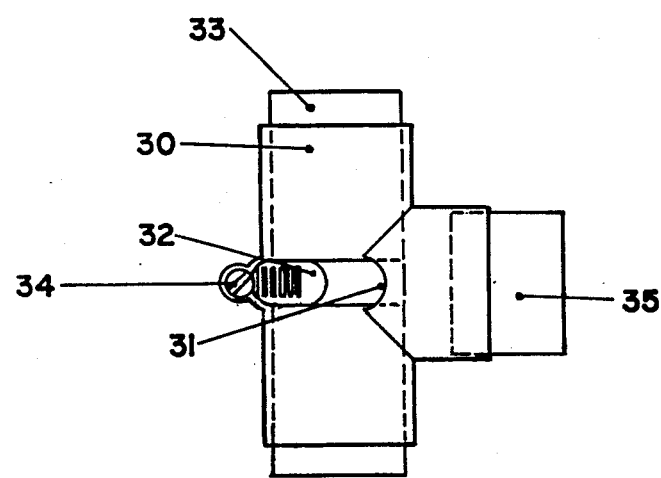
FIG. 4 is a detail drawing of the specially modified pipe tees which are used as adjustable connectors in the roller bar system part of the invention.
Figure 5:
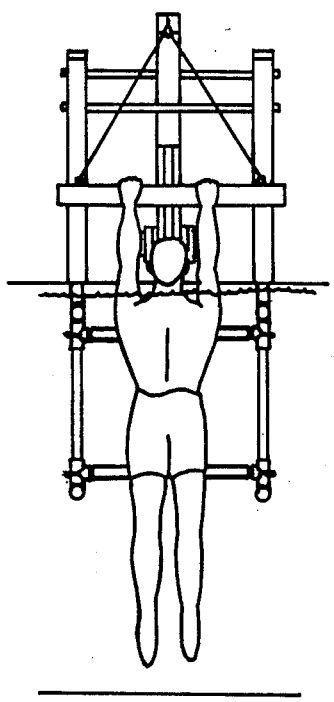
FIGS. 5A–5D are views of the invention during use.
Figure 5:
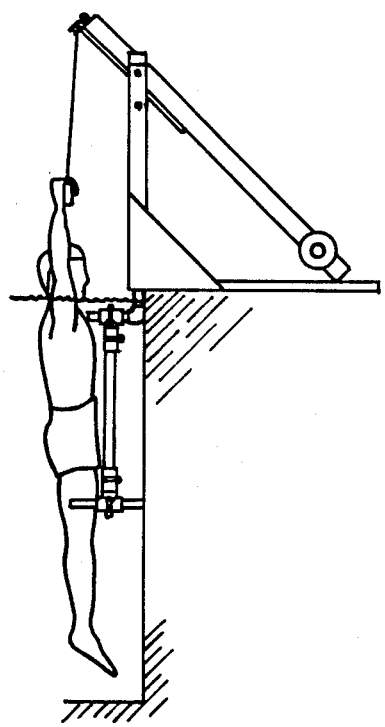
Figure 5:
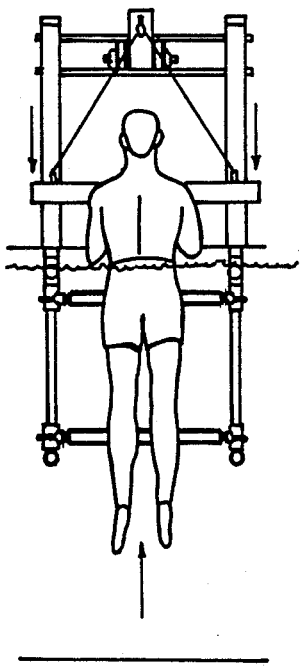
Figure 5:
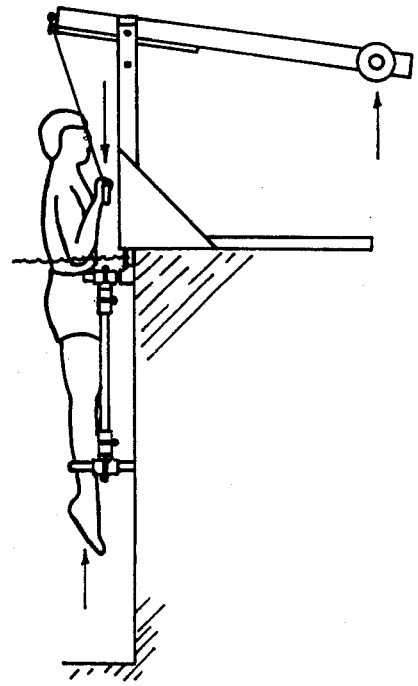

Refer now to FIG. 4 for a detailed description of the modified tees used in this invention.

Looking at FIG. 4 you see a plumbing type tee 30 whose long passage has been enlarged so that a pipe 33 may easily slide thru it. A hole 31 has been made at the junction of the tee 30. A hose clamp collar 32 runs thru the hole 31. The hose clamp 32 collar wraps around the sliding pipe and tee 30.

When the modified tee 30 is at a desired position on a pipe 33 the hose clamp screw 34 is tightened, drawing the hose clamp collar tightly against pipe 33 and the tee 30 holding both tightly in position.

A second pipe 35 may be permanently affixed to the other passage of the tee.

Refering back again to FIGS. 1,2 and 3.

The vertical guide pipes 36 have modified tees attached to them at top 24 and bottom 28. The modified top tees 24 allow the vertical guide pipes 36 to be positioned at varying distances from the pool edge by sliding the modified tees 24 on the top horizontal guide pipes 23.

The modified bottom tees 28 attached to the vertical guide pipes 36 have the bottom horizontal guide pipes 25 passing through them. The bottom horizontal guide pipes 25 can be positioned so that they brace the vertical guide pipes 36 against the side of a pool. This is done by sliding horizontal guide pipes 25 thru modified tees 28 and tightening them when they are in the desired position.

Sliding on the vertical guide pipes 36 are the modified tees 29 which are attached to the roller bar axle pipes 27 which are made of 1½" schedule 40 PVC pipes. The roller bars 26 are made of 2" diameter schedule 40 PVC pipes and slide over the narrower roller bar axle pipes 27 which are inserted through them.

The modified tees 29 attached to the roller bar axle pipes 27 allow the roller bars 26 positioning at various levels. The roller bars 26 keep the users body in desired alignment and give a comfortable surface for his body to rub against as his body rises and falls while pulling on the grasping bar 1.

I claim:

1. An exercise device for an exerciser suspended in water for doing chin-up exercise comprising:
    a base having fastening means for removably fastening the base to a pool deck;
    a pair of uprights mounted on and supported by the base;
    an axle bar mounted between the uprights at a location above the exerciser's head;
    a lever arm rotatably mounted on the axle bar;
    a grasping bar and cable, the cable connecting the grasping bar to the lever arm;
    weights mounted on the lever arm for resisting downward motion of the grasping bar, the weights being adjustable;
    a safey bar mounted between the uprights to prevent the lever arm from making a full rotation and striking the user;
    a pair of vertical guide pipes extending downwardly from the base;
    a plurality of roller pipes mounted horizontally between the guide pipes for keeping the exerciser's body in alignment; and,
    adjustable connectors mounting the roller pipes on the guide pipes for adjusting the vertical height of the roller pipes.

* * * * *